J. F. OTT.
PHONOGRAPH.
APPLICATION FILED MAR. 24, 1908.
936,271.
Patented Oct. 5, 1909.
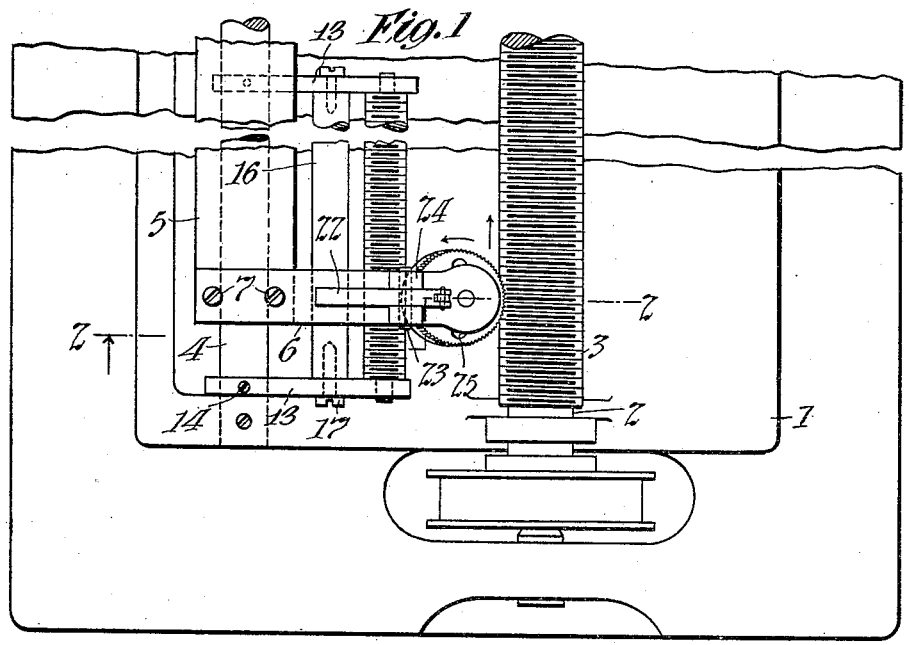
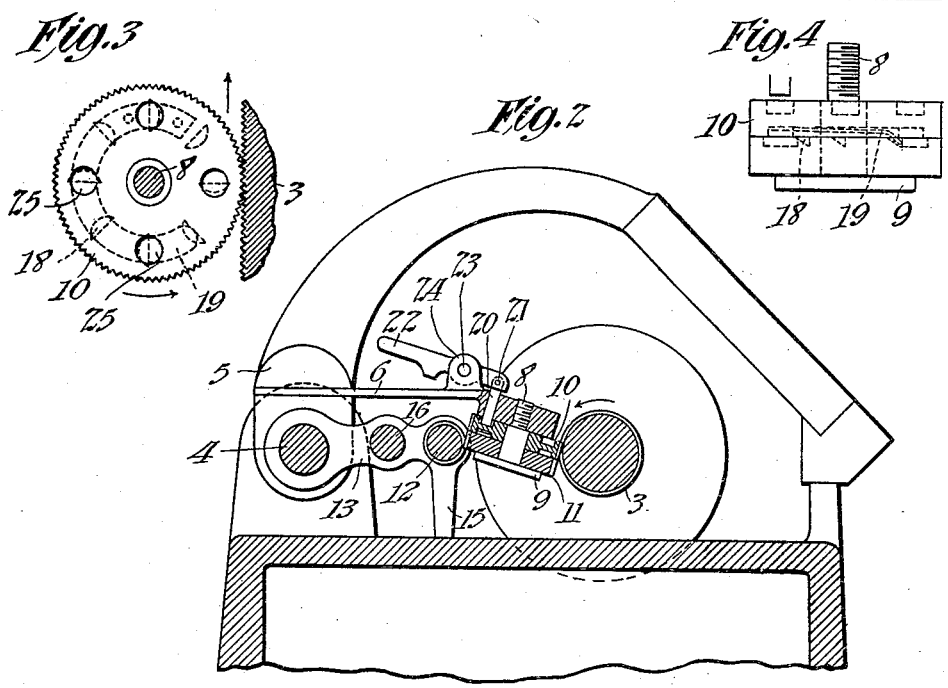
Witnesses:
Frank D. Lewis
Herbert H. Dyke
Inventor:
John F. Ott
by Frank L. Dyer
Atty.

UNITED STATES PATENT OFFICE.

JOHN F. OTT, OF ORANGE, NEW JERSEY, ASSIGNOR TO NEW JERSEY PATENT COMPANY, OF WEST ORANGE, NEW JERSEY, A CORPORATION OF NEW JERSEY.

PHONOGRAPH.

936,271.  Specification of Letters Patent.  Patented Oct. 5, 1909.

Application filed March 24, 1908. Serial No. 422,931.

*To all whom it may concern:*

Be it known that I, JOHN F. OTT, a citizen of the United States, and a resident of Orange, in the county of Essex and State of New Jersey, have invented certain new and useful Improvements in Phonographs, of which the following is a description.

My invention relates to phonographs and has for its object the provision of means whereby the traveling carriage which carries the reproducer or recorder may be fed at either of two desired rates of speed, so as to adapt it to operate, for example, upon records having one-hundred and two-hundred threads per inch, and said means are preferably designed so that they may be readily applied to phonographs of ordinary construction, such as are now in general use throughout this and other countries.

In order that my invention may be more fully understood, reference is hereby made to the accompanying drawing of which—

Figure 1 is a plan view of a portion of a phonograph to which my invention is applied; Fig. 2 is a section on line 2—2 of Fig. 1; Fig. 3 is a detail plan view of the rotary member which engages the feed screw of the phonograph and Fig. 4 is a side elevation of the same.

The phonograph shown is of ordinary form and comprises a base or body 1 which supports the main shaft 2 formed with the feed screw 3 which is generally of fine pitch, such as one-hundred threads to the inch. The body 1 also carries the back rod 4 upon which the sound box carriage 5 is slidably mounted in the usual manner. An arm 6 is secured at its rear end to the carriage 5 in any suitable manner, as by screws 7. The forward end of said arm is provided with a pin or stud 8 extending downwardly and provided with a head 9. Upon said stud are rotatably mounted a worm wheel 10 which engages the thread of the feed screw 3 and a spur gear 11 which engages a rack 12 fixedly applied to the back rod 4 by the supporting arms 13. These arms are preferably secured to the back rod by set screws 14, and are provided with depending feet 15 which rest upon the body 1. Said arms are united by a cross-rod 16 secured to said arms by screws 17. The gear 11 is formed with a set of ratchet teeth or notches 18 which are adapted to be engaged by a spring pawl 19, secured to the worm gear 10. Means are provided for securing the worm gear 10 against rotation and, as shown, comprise a pin 20 pivoted at 21 to a lever 22, said lever being pivoted at 23 to a pair of ears 24 formed integral with the arm 6. The worm gear 10 is provided with one or more sockets or recesses 25 each of which is adapted to receive the end of the pin 20, said recesses being shown as four in number.

The operation of the device is as follows: When the parts occupy the positions shown in Fig. 2, the worm gear 10 is held against rotation by the pin 20 and by reason of its engagement with the feed screw 3, the carriage 5 will be fed a distance equal to the pitch of the feed screw at each revolution thereof, that is, one one-hundredth of an inch, when the feed screw is of the usual form. At this time the spur gear 11 is merely an idler which will be caused to rotate by reason of its engagement with the rack 12 but which rotation will have no effect upon the worm gear 10 by reason of the ratchet teeth 18 slipping by the spring pawl 19. When the free end of the lever 22 is depressed the pin 20 will be removed from engagement with the socket 25 of the worm gear 10 and held in such position by frictional engagement with the bore which it occupies in the arm 6, and the gear 10 will therefore be rotated by the feed screw 3, and by reason of the engagement of the pawl 19 with one of the ratchet teeth 18, the gear 11 will be driven and by its engagement with the rack 12 will impart a forward progressive movement to the carriage 5, the rate of which when its diameter is the same as that of the worm gear 10 will be one-half of that previously described, that is, one two-hundredth of an inch for each revolution of the feed screw.

Having now described my invention, what I claim is:

1. In a phonograph, the combination of the rotating feed screw and traveling carriage, and means for feeding the same comprising a worm gear carried by the carriage and engaging said feed screw, a rack, a spur gear engaging said rack, means for locking said worm gear against rotation, and a ratchet connection between said worm gear and spur gear, substantially as set forth.

2. In a phonograph, the combination of the rotating feed screw and traveling carriage, and means for feeding the same comprising a worm gear movable with said carriage and in engagement with said feed screw, means for locking said worm gear against rotation, a rotary member carried by said carriage and driven by said worm gear through a one-way connection when the locking means is withdrawn, for feeding said carriage at a different rate from that imparted to it by the worm gear when locked against rotation and an abutment with which said rotary member coöperates, substantially as set forth.

3. In a phonograph, the combination of the rotating feed screw and traveling carriage, a worm gear for feeding said carriage thereby and in engagement with said feed screw, means for locking said worm gear against rotation, and a rotary member operatively connected to said worm gear and adapted to be driven thereby when the said locking means is withdrawn, substantially as set forth.

4. In a phonograph, the combination of the rotating feed screw and traveling carriage, a rotary member carried by the carriage in engagement with the said feed screw, removable means for locking said rotary member against rotation, a second rotary member carried by said carriage, a pawl and ratchet connection between said rotary members and a member with which said second member engages, substantially as set forth.

5. In a phonograph, the combination of the traveling carriage, the arm 6 extending forwardly therefrom, the worm gear 10 rotatably mounted at the forward end of said arm and formed with a socket 25, a pin 20 movable into and out of said socket for locking said gear against rotation, means holding said pin against lateral movement and a feed screw with which said worm gear engages, substantially as set forth.

6. An attachment for phonographs comprising an arm 6 adapted to be secured to the traveling carriage, gears 10 and 11 rotatably mounted on said arm, a driving connection between said gears, and means for locking said gear 10 against rotation, substantially as set forth.

7. An attachment for phonographs comprising a pair of arms 13 adapted to be sleeved upon the back rod of the phonograph, a rack carried thereby, and feet 15 applied to said arms and adapted to rest upon the body of the phonograph, substantially as set forth.

8. An attachment for phonographs comprising an arm adapted to be secured to the traveling carriage, a worm gear rotatably mounted at the forward end of said arm adapted to engage the feed screw and formed with a socket therein, a pin movable into and out of said socket for locking said gear against rotation, and a pivoted lever mounted on said arm to one end of which said pin is secured, substantially as set forth.

This specification signed and witnessed this 23 day of March 1908.

JOHN F. OTT.

Witnesses:
 FRANK D. LEWIS,
 H. H. DYKE.